US008633937B2

(12) United States Patent
Nishimaki et al.

(10) Patent No.: US 8,633,937 B2
(45) Date of Patent: Jan. 21, 2014

(54) INFORMATION PROCESSING APPARATUS AND INFORMATION PROCESSING METHOD

(75) Inventors: Hisashi Nishimaki, Kanagawa (JP);
Masanori Kanemaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 13/166,730

(22) Filed: Jun. 22, 2011

(65) Prior Publication Data
US 2011/0316863 A1  Dec. 29, 2011

(30) Foreign Application Priority Data

Jun. 29, 2010  (JP) ................................ P2010-148192

(51) Int. Cl.
*G06F 13/00* (2006.01)
(52) U.S. Cl.
USPC ......................................................... 345/536
(58) Field of Classification Search
None
See application file for complete search history.

(56) References Cited

U.S. PATENT DOCUMENTS

| 5,384,900 | A | * | 1/1995 | Sato et al. | ...................... 345/556 |
| 6,075,545 | A | * | 6/2000 | De Bonet et al. | .............. 345/571 |
| 6,701,011 | B1 | * | 3/2004 | Nakajima | ...................... 382/167 |
| 7,193,738 | B2 | * | 3/2007 | Yuasa | .......................... 358/1.15 |

FOREIGN PATENT DOCUMENTS

JP  2008-98911  4/2008

* cited by examiner

*Primary Examiner* — Aaron M Richer
*Assistant Examiner* — Nicholas R Wilson
(74) *Attorney, Agent, or Firm* — Frommer Lawrence & Haug LLP; William S. Frommer; Ellen Marcie Emas

(57) ABSTRACT

A memory section provides an input buffer capable of holding image data being a processing target of each processing by an image processing unit, and an output buffer capable of holding image data being a processing result. Through an input section, a user selects a plurality of kinds of processing to be executed by the image processing unit, and an execution sequence of the plurality of kinds of processing. A controller section reserves, based on information selected by a user through the input section, an input buffer and an output buffer for each processing in the memory section, sets an input-output connection relation between the buffers, and notifies, based on the set connection relation, the image processing unit of address information of the input buffer in the memory section and the output buffer for each processing sequentially executed by the image processing unit.

4 Claims, 14 Drawing Sheets

INFORMATION PROCESSING APPARATUS AND INFORMATION PROCESSING METHOD

BACKGROUND

The present disclosure relates to an information processing apparatus executing image processing by using, for example, a GPU (Graphics Processing Unit), and an information processing method.

In recent years, enhanced performance and high functionality of general-purpose computer hardware enable image processing by using general-purpose computer hardware, which only dedicated hardware was able to implement before. In the general-purpose computer hardware, specifically, CPUs (Central Processing Unit) and RAMs (Random Access Memory) used as main memories exhibit extremely high speed, and as a result, complicated effect processing with respect to large-capacity image data may be performed in an economic and satisfying time period.

Image processing may be performed at a further higher speed by introducing GPU (Graphics Processing Unit) which is an arithmetic processing device designed so as to be specialized in parallel arithmetic processing. The parallel arithmetic processing by GPU is implemented by a mechanism including issuing the same instructions to a plurality of arithmetic units and executing the same instructions by the respective arithmetic units independently. To the contrary, in CPU, different instructions are issued to a plurality of arithmetic units and the arithmetic units execute different instructions, respectively. Therefore, GPU may exhibit enhanced performance in processing in which arithmetic results of part of processing do not affect the entire processing such as image processing. To the contrary, CPU is suitable for sequential processing.

Further, recently, a technical field of GPGPU (General-Purpose computing on Graphics Processing Units) which enables GPU not only to perform image processing but also to be used for other numerical processing is known.

Japanese Patent Application Laid-open No. 2008-98911 (paragraphs 0057, 0068, and 0072) (hereinafter referred to as Patent Document 1) describes that, in a case where a GPU executes effect processing on data a plurality of times, in order to reduce the number of transferring/receiving data for each effect processing between a system memory and the GPU, the GPU executes effect processing a plurality of times through exchange of data between buffers provided in a GPU memory, and transfers the final effect processing result to a CPU memory. Further, it is also described that a CPU notifies the GPU of the kinds and the order of a plurality of effects to be executed by the GPU.

In a case where a GPU executes effect processing on data a plurality of times as described in a technology of Patent Document 1, it is necessary to reserve buffers holding effect-processing-target data and buffers holding effect-processing-result data in a GPU memory for respective effects (initialization of GPU memory), and to set connection relations of the respective buffers according to the execution sequence of the respective effects.

Meanwhile, effect contents such as kinds, the number, an execution sequence, and the like of effects may be arbitrarily changed by a user. Changes of effect contents may require change of the number of buffers to be reserved in a CPU memory in a case where the number of effects is increased/decreased and the like. Because of this, in a case where a CPU memory is initialized and connection relations of the respective buffers are set every time effect contents are changed, small changes such as passing one of a plurality of effects or only changing an execution sequence of a plurality of effects require operation time for initializing a CPU memory/setting connection relations of the respective buffers, and the like, whereby there is a fear that the overall efficiency declines.

SUMMARY

In view of the above-mentioned circumstances, it is desirable to provide an information processing apparatus and an information processing method which may shorten operation time by an image processing unit caused by changes of a plurality of pieces of effect processing successively executed by the image processing unit, to thereby improve overall efficiency.

According to an embodiment of the present disclosure, there is provided an information processing apparatus, including an image processing unit capable of processing an image, a memory section capable of providing an input buffer capable of holding image data being a processing target of each processing by the image processing unit, and an output buffer capable of holding image data being a processing result, an input section through which a user selects a plurality of kinds of processing to be executed by the image processing unit, and an execution Sequence of the plurality of kinds of processing, and a controller section configured to reserve, based on information selected by a user through the input section, an input buffer and an output buffer for each processing in the memory section, to set an input-output connection relation between the buffers, and to notify, based on the set connection relation, the image processing unit of address information of the input buffer in the memory section and the output buffer for each processing sequentially executed by the image processing unit.

According to the present disclosure, in a case where the image processing unit applies a plurality of pieces of processing in succession on image data, image data is input/output into/from the input/output buffers in the memory section allocated to the respective effects to thereby execute a plurality of pieces of processing in succession, whereby the number of exchanging image between the image processing unit and another processing unit may be minimized (two). As a result, the speed of effect processing may be higher. Further, according to the present disclosure, the controller section sets an input-output connection relation between the buffers reserved in the memory section for each processing, and notifies, based on the set connection relation, the image processing unit of address information of the input buffer in the memory section and the output buffer for each processing sequentially executed by the image processing unit. So, the number of effects that the image processing unit executes may be decreased, or an execution sequence of effects may be changed as needed.

The input section may be capable of receiving from a user an instruction to cancel part of the plurality of kinds of processing to be executed by the image processing unit, and the controller section may be configured to update, based on the input instruction content, an input-output connection relation between the buffers, and to notify, based on the updated connection relation, the image processing unit of address information of the input buffer in the memory section and the output buffer for each processing sequentially executed by the image processing unit.

Further, the input section may be capable of receiving from a user an instruction to change an execution sequence of the plurality of kinds of processing to be executed by the image processing unit, and the controller section may be configured to update, based on the input instruction content, an input-output connection relation between the buffers, and to notify, based on the updated connection relation, the image processing unit of address information of the input buffer in the memory section and the output buffer for each processing sequentially executed by the image processing unit.

According to another embodiment of the present disclosure, there is provided an information processing method, including selecting by a user, through an input section, a plurality of kinds of processing to be executed by an image processing unit capable of processing an image, and an execution sequence of the plurality of kinds of processing, reserving, by a controller section, based on information selected by a user through the input section, an input buffer and an output buffer for each processing in a memory section capable of providing an input buffer capable of holding image data being a processing target of each processing by the image processing unit and an output buffer capable of holding image data being a processing result, setting, by the controller section, an input-output connection relation between the buffers, and notifying, by the controller section, based on the set connection relation, the image processing unit of address information of the input buffer in the memory section and the output buffer for each processing sequentially executed by the image processing unit.

According to the present disclosure, operation time by an image processing unit caused by changes of a plurality of pieces of effect processing successively executed by the image processing unit may be shortened, to thereby improve overall efficiency.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

First Embodiment (Structure of Information Processing Apparatus)

This embodiment relates to an information processing apparatus which may execute image processing such as, for example, an effect on image data by executing a video editing program in a computer on which a CPU (Central Processing Unit) and a GPU (Graphics Processing Unit) are mounted.

Figure 1:
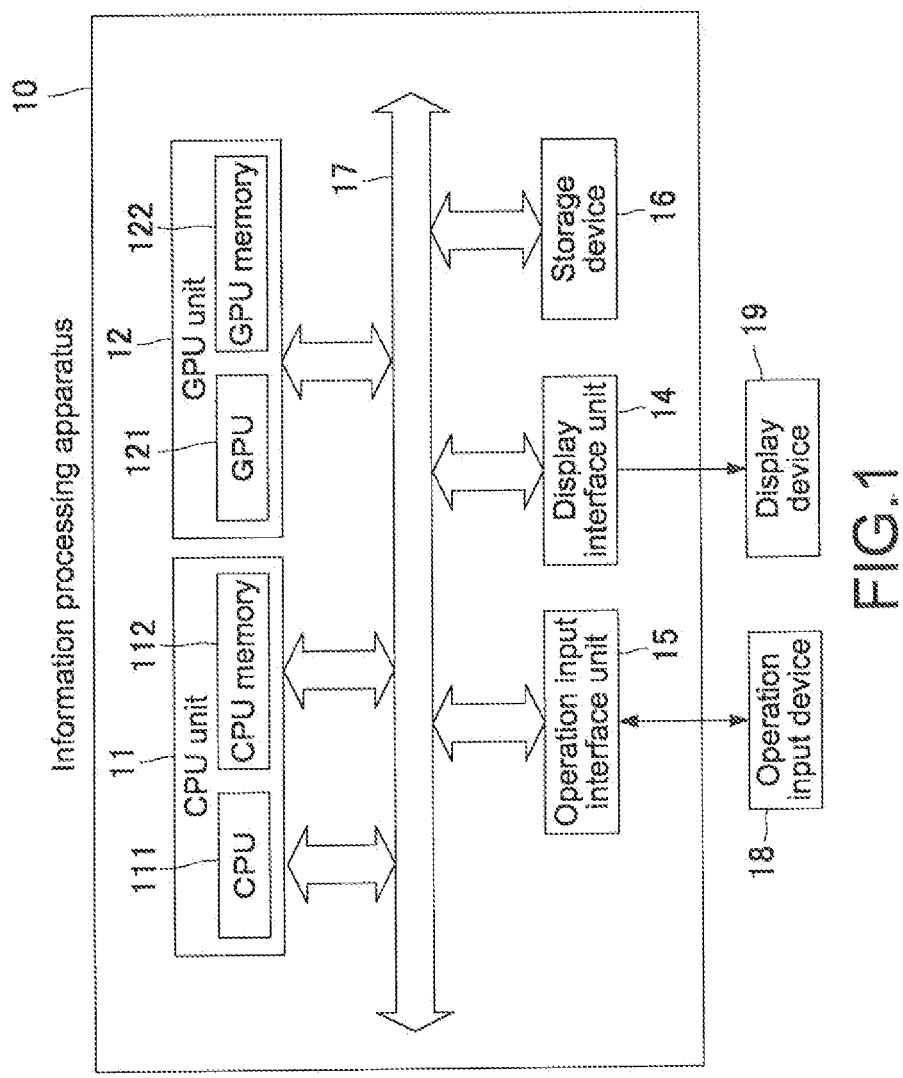
FIG. 1 is a diagram showing a structure of an information processing apparatus according to an embodiment of the present disclosure.

FIG. 1 is a diagram showing a structure of an information processing apparatus according to an embodiment of the present disclosure.

As shown in FIG. 1, an information processing apparatus 10 includes a CPU unit 11, a GPU unit 12, a display interface unit 14, an operation input interface unit 15, a storage device 16, and a bus 17 connecting them each other.

The CPU unit 11 includes a CPU 111 (controller section) and a memory (hereinafter referred to as "CPU memory 112"). The CPU 111 controls, based on a video editing program stored in the CPU memory 112, arithmetic processing for video editing and effect processing on image data by the GPU unit 12. The CPU 111 may reflect various instructions input by a user through an operation input device 18 connected to the operation input interface unit 15 in behaviors of the video editing program.

The GPU unit 12 includes a GPU 121 (image processing unit) and a memory (hereinafter referred to as "GPU memory 122") (memory section). Controlled by the CPU 111, the GPU 121 may store image data read out from the CPU memory 112 in a buffer provided in the GPU memory 122 through the bus 17, and execute, in parallel, effect processing on the image data for each of units by dividing an image, such as a thread.

The display interface unit 14 is an interface to a display device 19. The display interface unit 14 receives image data on which effects are applied by the CPU unit 11 or the GPU unit 12 to perform drawing processing, and supplies drawing data to the display device 19.

The operation input interface unit 15 is an interface to the operation input device 18, and performs processing such as supplying data and instructions by a user input from the operation input device 18 to the CPU 111, and the like.

The storage device 16 stores image data of respective frames constituting unedited and edited moving images. Further, the storage device 16 also stores a video editing program. The video editing program stored in the storage device 16 is loaded in the CPU memory 112 of the CPU unit 11, and the CPU 111 interprets the video editing program to execute.

(Structure of Video Editing Program)

The video editing program includes a video editing main program, effect programs for CPU causing the CPU 111 to execute effect processing, effect programs for GPU causing the GPU 121 to execute effect processing, and the like. The effect programs for CPU and the effect programs for GPU are prepared for the kinds of effects, respectively. Those effect programs may be provided as plug-in programs capable of connecting to the video editing program individually and selectively.

The video editing main program includes a GUI program allowing a user to select an effect-target frame, the kinds of effect applied on image data of the frame, parameters for the effect, an execution sequence of a plurality of effects, and the like, and inputting them as effect setting information. In an editing environment displayed on a display of the display device 19 based on the GUI program, a user may input the above-mentioned effect setting information by using the operation input device 18. The input effect setting information is held in a predetermined area provided in the CPU memory 112.

Note that, one of the effect program for CPU and the effect program for GPU is selected and adopted for the respective effects selected by a user considering whether an image processing area is part of an image or the entire image, a consumption rate of the GPU memory 122, a load of the CPU 111, and the like. For example, the effect program for CPU is selected for processing on part of an image, and the effect program for GPU is selected for processing on the entire image. Further, in view of a consumption rate of the GPU memory 122, a load on the CPU 111, and the like, selected results may be modified.

Here, a case where the GPU unit 12 executes a plurality of pieces of effect processing in succession will be described. In this case, the GPU 121 executes, in succession, a plurality of pieces of effect processing by using input/output buffers allocated to the GPU memory 122 for the respective effects. Therefore, it is desirable to provide a technique managing connection relations of input/output buffers of the respective effects. According to this embodiment, the video editing program causes the CPU 111 to manage connection relations of input/output buffers of the respective effects.

(Behaviors of Information Processing Apparatus of this Embodiment)

Next, behaviors of the information processing apparatus of this embodiment will be described.

The behaviors will be described in the order of
1. effect setting,
2. initializing process of GPU memory,
3. effect execution, and
4. change of the number of effects and execution sequence.

(1. Effect Setting)

The CPU 111 stores, in the CPU memory 112, effect setting information such as A. (one or more) kinds of effects, B. parameters for the respective effects, and C. an execution sequence of a plurality of effects selected by a user by using the operation input device 18.

A specific example of selecting the effect setting information by a user will be described.

First, the CPU 111 displays, on the display device 19, information for selecting a scene in a moving image according to an instruction by a user. The information for selecting a scene is, for example, image data obtained by reducing a resolution of a frame image representing the scene (thumbnail image) or the like. In a case where a scene on which a user wishes to apply an effect is selected from the information for selecting a scene by using the operation input device 18 such as a mouse, the CPU 111 reads out image data of one or more frames belonging the selected scene from the storage device 16 in a predetermined buffer provided in the CPU memory 112. Subsequently, the CPU 111 receives input of output conditions such as an enlargement/reduction rate and a frame rate from a user. The CPU 111 requests the display interface unit 14 to output image data stored in a buffer of the CPU memory 112 according to the output conditions. As a result, image data of the frame processed according to the output conditions is displayed as effect-target image data on an editing environment screen (described later) on the display device 19.

Next, an instruction to start editing is input by a user through the operation input device 18. Receiving the instruction to start editing, the CPU 111 displays a list of names of effects capable of being executed on an editing environment screen (described later) on the display device 19. In a case where one effect name is selected from the list by a user, an effect program corresponding to the selected effect name is activated, and effect processing on image data is executed.

Figure 2:
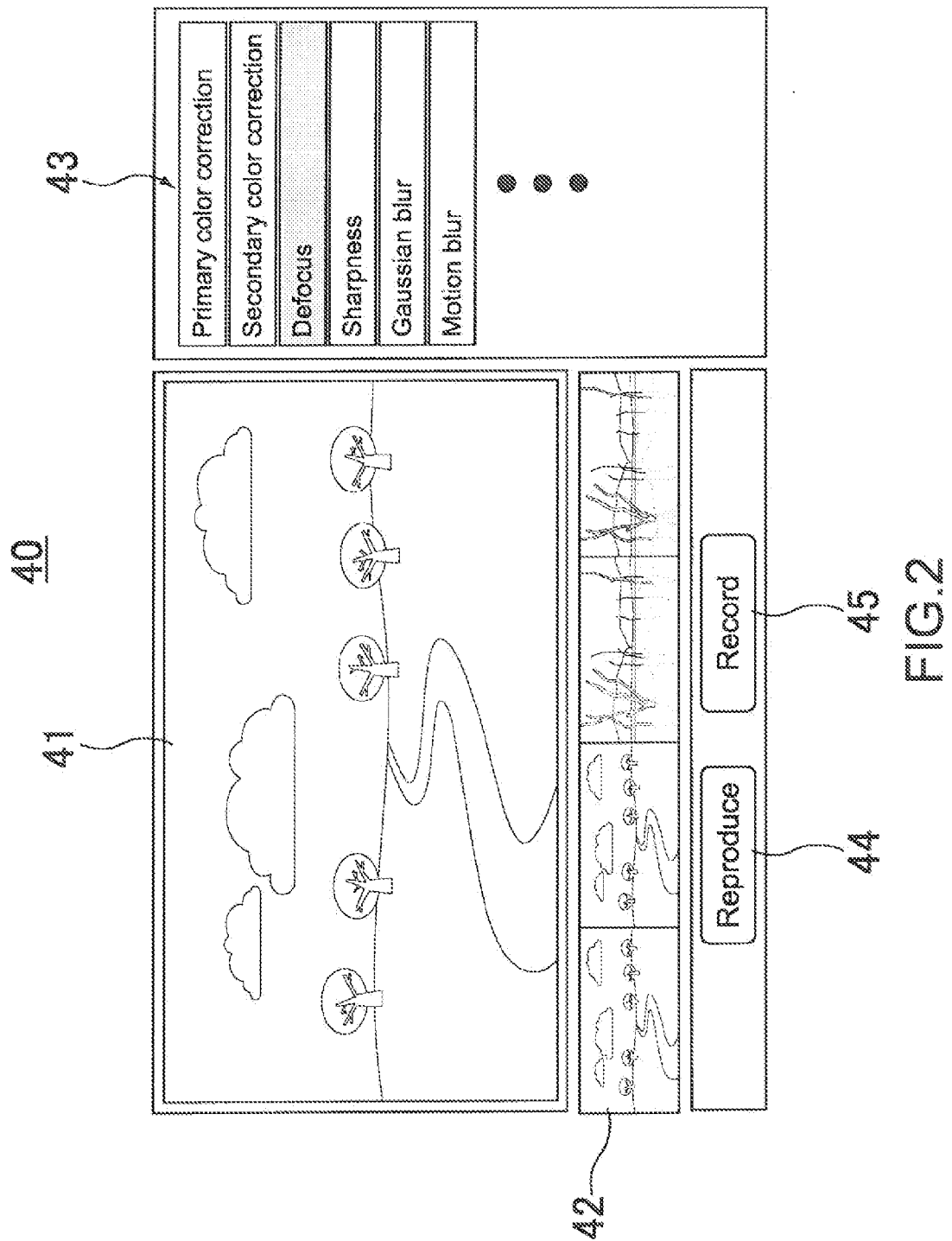
FIG. 2 is a diagram showing an example of an editing environment screen.

FIG. 2 is a diagram showing an editing environment screen 40. As shown in FIG. 2, an output image display window 41, a track display window 42, an effect candidate list 43, and the like are displayed on the editing environment screen 40. The output image display window 41 is a window on which image data of a frame enlarged/reduced according to output conditions is displayed as an effect-target image, or an effect-result image is displayed. The track display window 42 is a window on which image data of a plurality of successive frames corresponding to part of scenes selected by a user are simultaneously displayed. In the track display window 42, the horizontal direction represents the direction of time. By operating a slider (not shown) for selecting time positions in right-and-left horizontal directions through the operation input device 18 by a user, time positions of image data of a plurality of frames simultaneously displayed on the track display window 42 are moved (changed over). Through the changeover, a user may see image data of all the frames included in a selected scene. Further, image data of one frame to be displayed on the output image display window 41 may be selected from image data of a plurality of frames displayed on the track display window 42 through the operation input device 18 by a user. The effect candidate list 43 is a list of the kinds of effects to be applied on image data of a frame displayed on the output image display window 41. The kind of effect to be applied on image data of a frame displayed on the output image display window 41 is selected through the operation input device 18 such as a mouse by a user.

In a case where one effect name is selected from the effect candidate list 43, the CPU 111 displays an effect GUI window for setting various parameters of an effect whose effect name is selected. Parameters are adjusted for each item on the effect GUI window through the operation input device 18 such as a mouse by a user.

Figure 3:
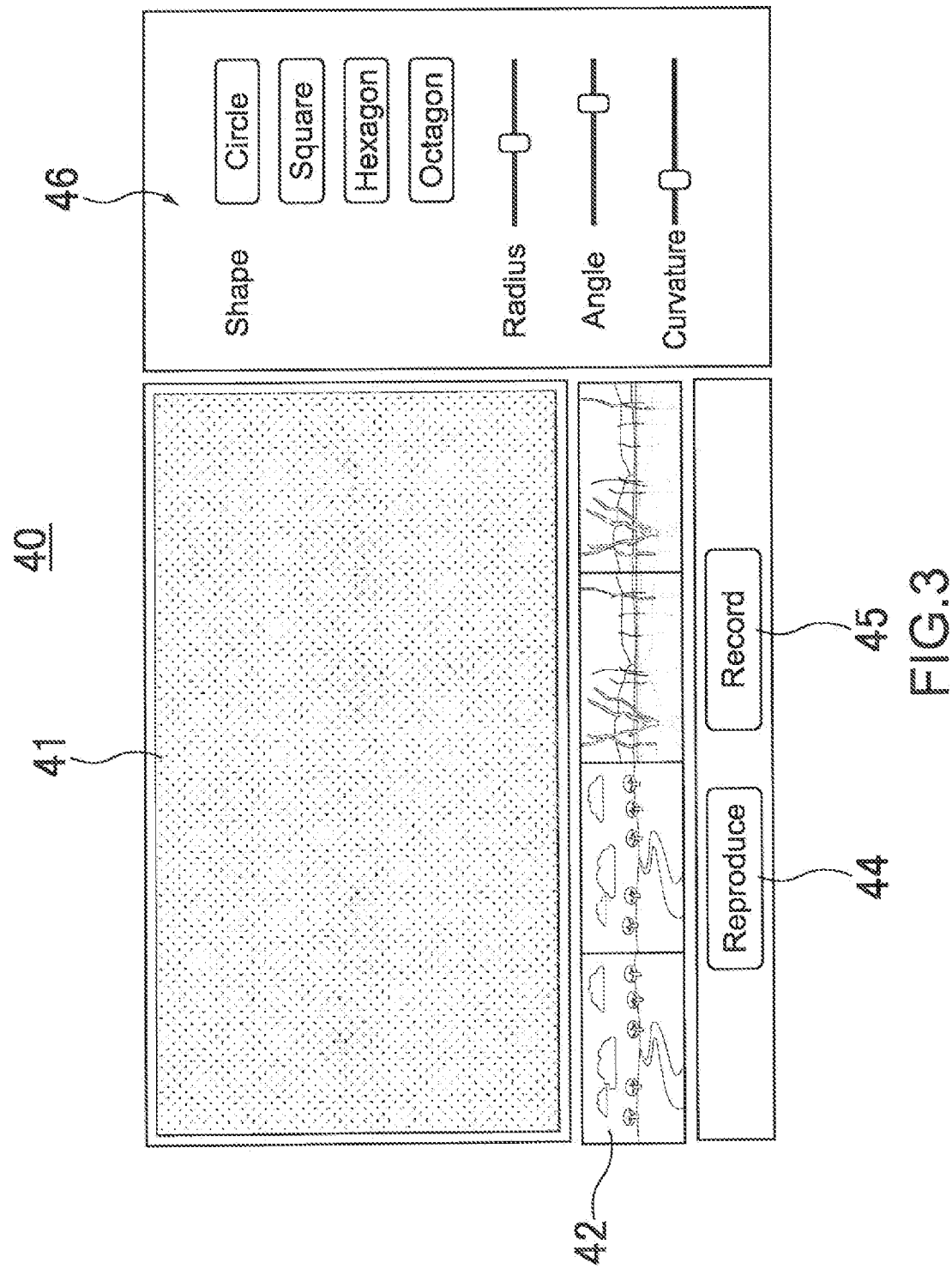
FIG. 3 is a diagram showing an example of an editing environment screen displaying an effect GUI window for setting defocus parameters.

For example, a case where defocus is selected as the kind of effect will be described. In a case where defocus is selected, an effect GUI window 46 for setting parameters of defocus is displayed on the editing environment screen 40 as shown in FIG. 3. Through the effect GUI window 46 for defocus, a user may select the shape of iris by operating buttons and adjust parameters such as radius, angle, and curvature by operating sliders by using the operation input device 18 such as a mouse.

According to the parameters selected through the effect GUI window 46 by a user, the CPU 111 executes effect processing on image data of a frame displayed on the output image display window 41. In this case, the effect processing is executed in real time to selecting operation of each parameter and reflected in image data of a frame displayed on the output image display window 41, whereby the optimum parameter may be efficiently selected for each item.

After the parameters are adjusted, a user may input instruction including parameter adjusting results to execute effects on image data of all the frames included in the selected scene into the CPU 111 by using the operation input device 18. Instructions are made by clicking processing output buttons provided on the editing environment screen 40, and the like. As shown in FIGS. 2 and 3, the processing output buttons include a reproduce button 44 and a record button 45. In a case where the reproduce button 44 is operated by a user, an effect including adjusting results of parameters applied on image data of a frame selected by a user is similarly applied on image data of other frames included in the scene, and a moving image corresponding to the scene is output to the output image display window 41. A user may watch the moving image displayed on the output image display window 41, and confirm the results of the effect applied on the whole scene. Further, in a case where the record button 45 is operated by a user, an effect including adjusting results of parameters applied on image data of a frame selected by a user is similarly applied on image data of other frames included in the scene, and written in the storage device 16.

Further, in a case of applying a plurality of kinds of effect processing on image data of a frame, after selecting one effect and adjusting a parameter, selecting another kind of effect and adjusting a parameter may be repeated continuously. In this case, an effect order selected by a user is set to an execution sequence of respective effects as it is.

Through the above-mentioned operations, (one or more) kinds of effects, parameters for each effect, and an execution sequence of a plurality of effects are set as effect setting information. The effect setting information is stored in a predetermined area in the CPU memory 112.

Here, subsequent behaviors will be described assuming a case where a setting has been made such that the GPU 121 executes, in succession, effect processing three times on image data of each frame. Note that the three times of effect processing may not necessary be different kinds of effect processing.

Hereinafter, the subsequent behaviors will be described with reference to flowcharts of FIGS. 4 to 6.

Figure 4:
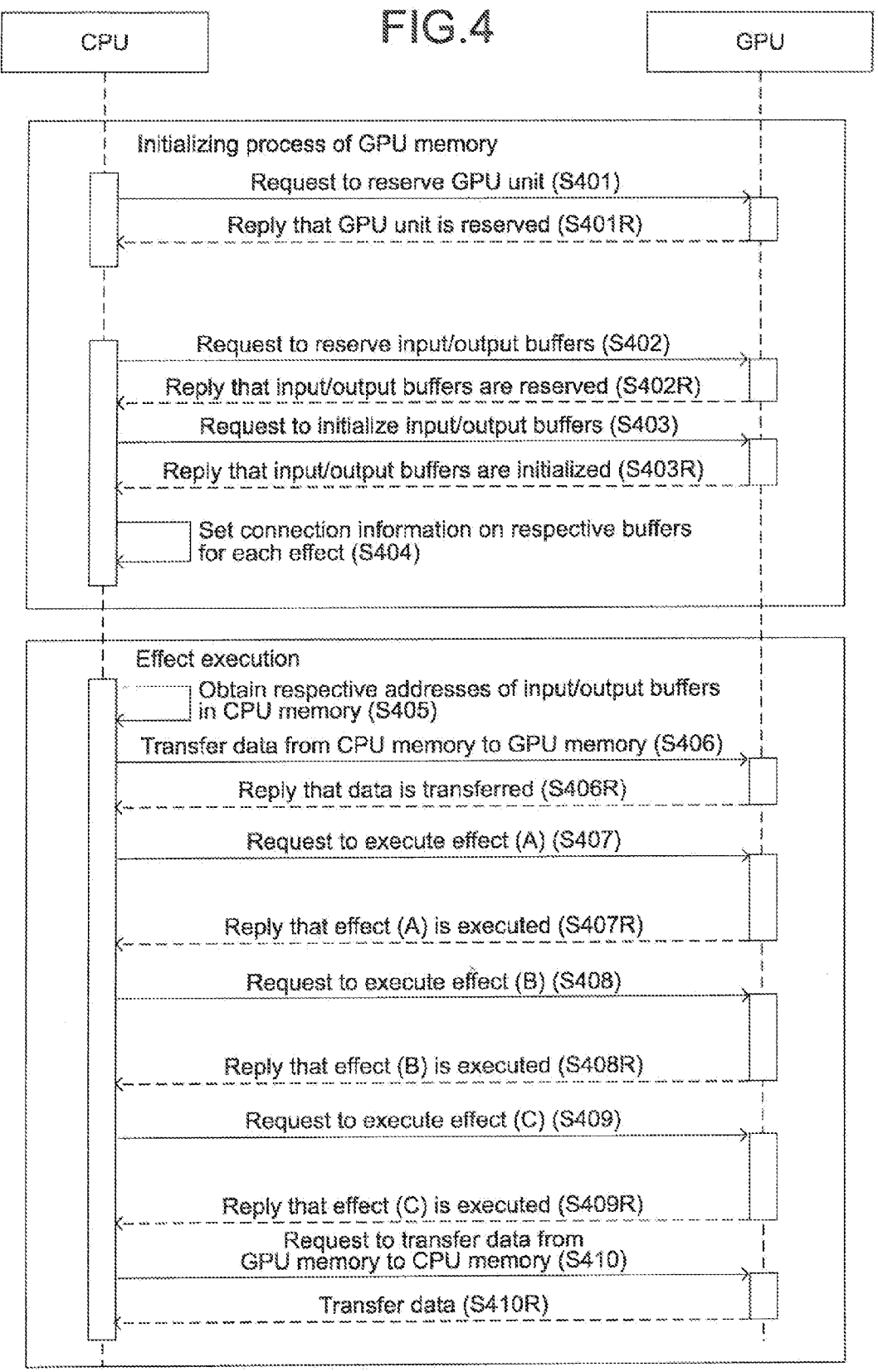
FIG. 4 is a sequence diagram relating to effect execution controls between a CPU unit and a GPU unit.

FIG. 4 is a sequence diagram relating to effect execution controls between the CPU unit 11 and the GPU unit 12.

Figure 5:
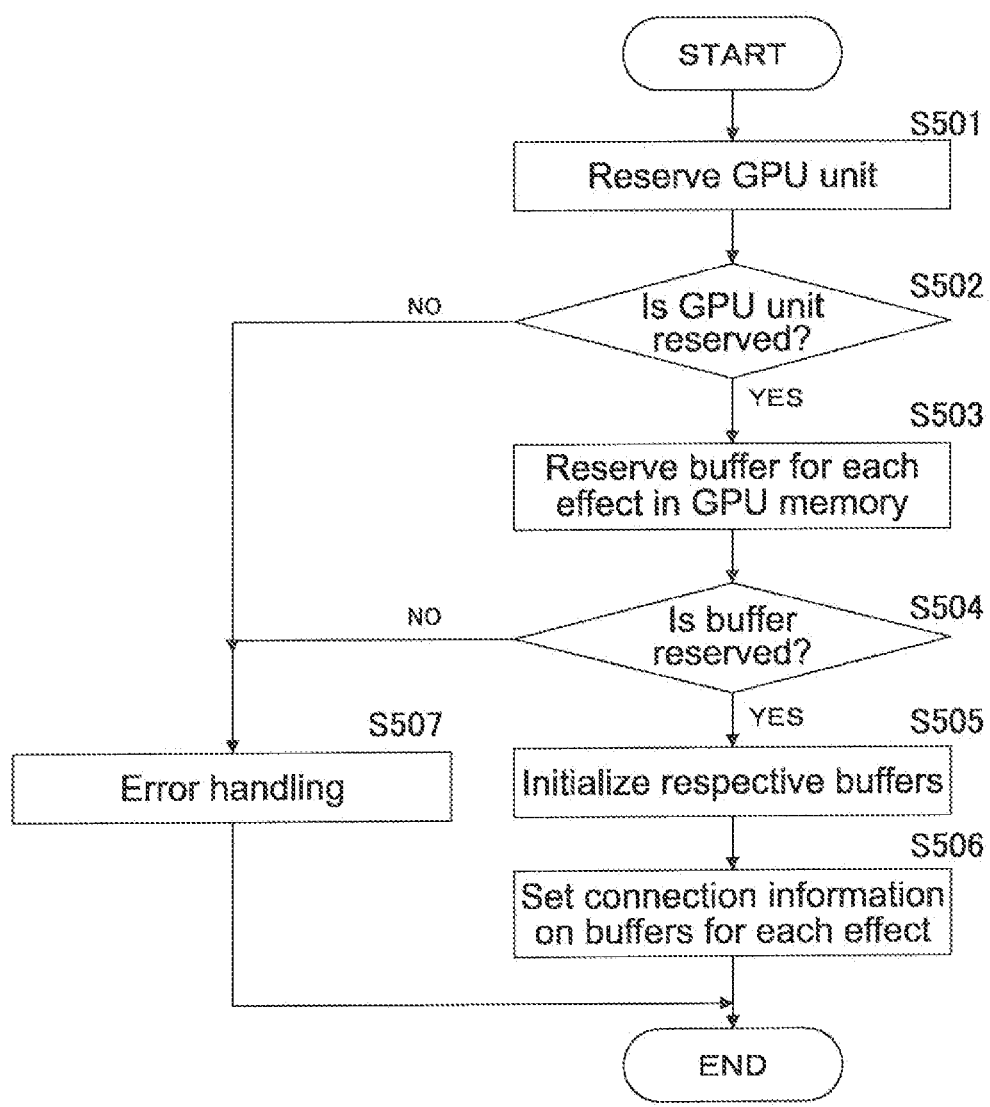
FIG. 5 is a flowchart showing a flow of an initializing process of a GPU memory by a CPU in the sequence of FIG. 4.

FIG. 5 is a flowchart showing a flow of an initializing process of the GPU memory by the CPU 111 in the sequence of FIG. 4.

Figure 6:
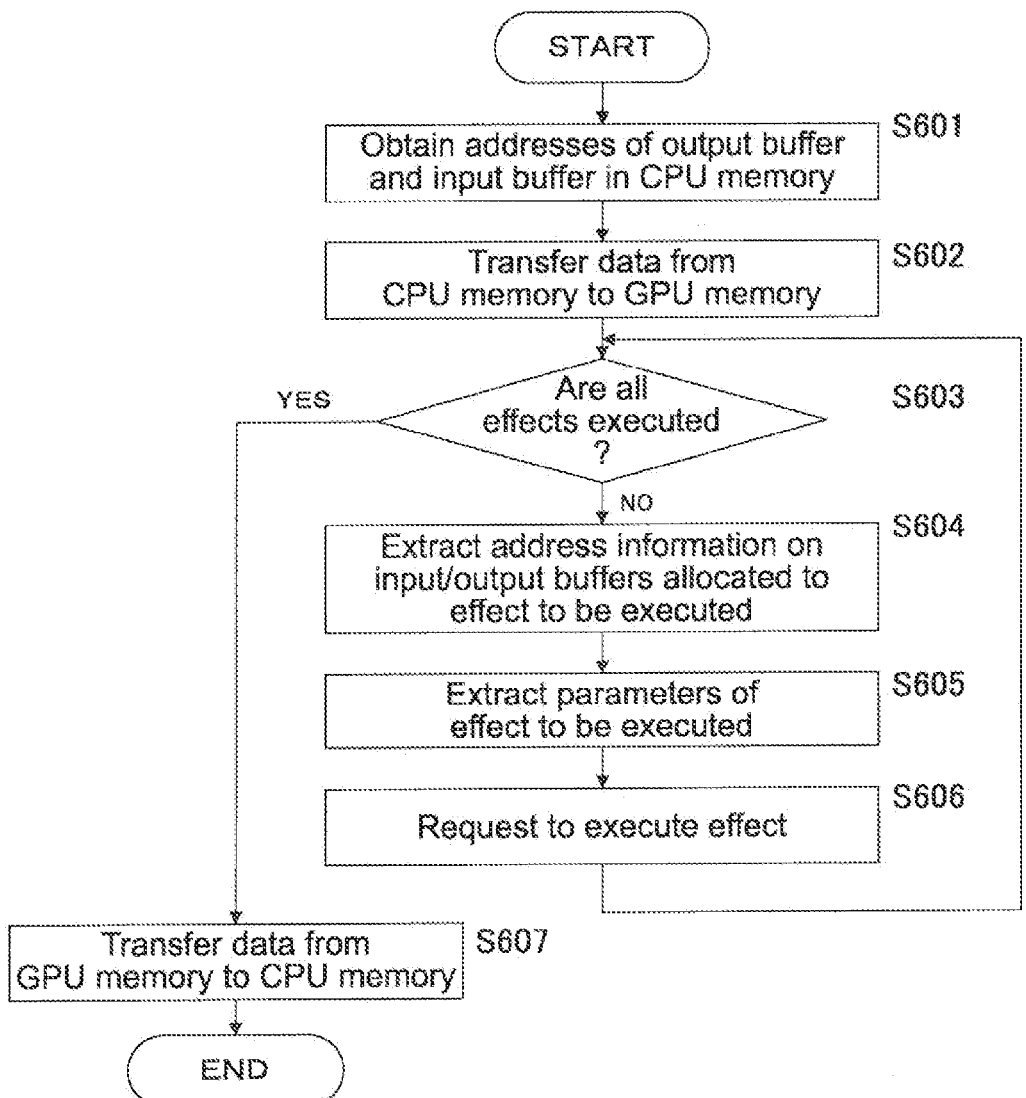
FIG. 6 is a flowchart showing a flow of an execution control of GPU effects by the CPU in the sequence of FIG. 4.

FIG. 6 is a flowchart showing a flow of an execution control of GPU effects by the CPU 111 in the sequence of FIG. 4.

Figure 7:
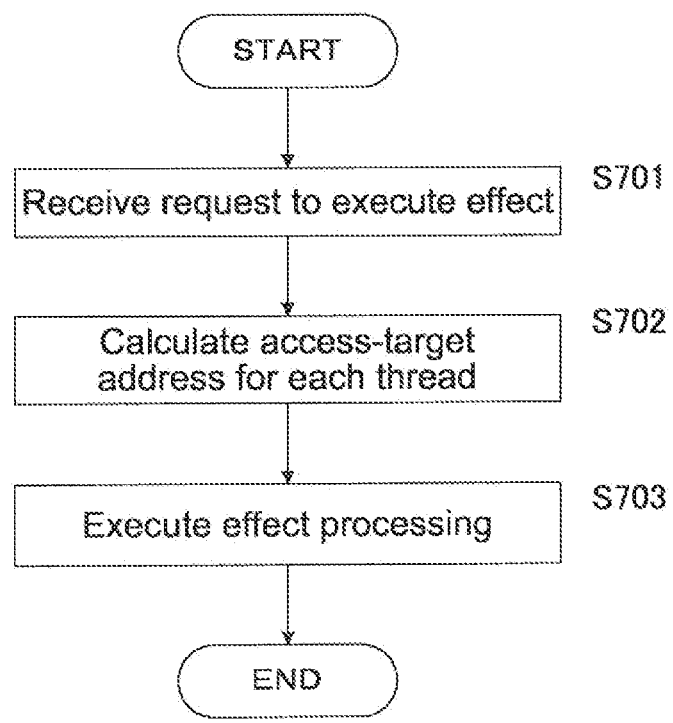
FIG. 7 is a flowchart showing a flow of effect processing by a GPU in the sequence of FIG. 4.

FIG. 7 is a flowchart showing a flow of effect processing by the GPU 121 in the sequence of FIG. 4.

(2. Initializing Process of GPU Memory)

Next, an initializing process by the GPO memory 122 in a case where setting has been made such that the GPU 121 executes a plurality of pieces of effect processing in succession as described above will be described.

The CPU 111 executes controls as follows based on the video editing program.

First, the CPU 111 reserves the GPU unit 12 (FIG. 4: S401/S401R, FIG. 5: S501). As a result, the CPU 111 recognizes the GPU unit 12 connected through the bus 17, and obtains information such as the capacity of the GPU memory 122.

Here, in a case where the CPU 111 fails to recognize the GPU unit 12 or fails to obtain information such as a capacity of the GPU memory 122: for some reasons (FIG. 5: S502, No), the CPU 111 executes a predetermined error handling by, for example, displaying that (FIG. 5: S507), and completes the video editing program.

In a case where the CPU 111 succeeds in recognizing the GPU unit 12 and obtaining information such as a capacity of the GPU memory 122 (FIG. 5: S502, YES), the CPU 111 attempts to reserve input/output buffer areas for each of the above-mentioned plurality of effects in the GPU memory 122 (FIG. 5: S503). That is, the CPU 111 generates a request to reserve input/output buffer areas for each effect based on the effect setting information stored in the CPU memory 112, and transmits it to the GPU 121 (FIG. 4: S402). In response to the request, the GPU 121 reserves input/output buffer areas for each effect in the GPU memory 122, and notifies the CPU 111 of address information on each input/output buffer (FIG. 4: S402R). In a case where the CPU 111 fails to reserve each input/output buffer for some reasons (FIG. 5: S504, No), the CPU 111 executes a predetermined error handling by, for example, displaying that (FIG. 5: S507), and completes the video editing program. Further, in a case where the CPU 111 succeeds in reserving each input/output buffer (FIG. 5: S504, YES), the CPU 111 initializes the input/output buffers (FIG. 4: S403/S403R, FIG. 5: S505).

Subsequently, the CPU 111 sets connection information on input/output buffers for each effect based on effect setting information stored in the CPU memory 112, and stores it in the CPU memory 112 (FIG. 4: S404, FIG. 5: S506). The connection information on input/output buffers for each effect is information showing from which address (buffer) in the GPU memory 122 each effect obtains image data, and in which address (buffer) in the GPU memory 122 each effect writes an effect processing result.

Figure 8:
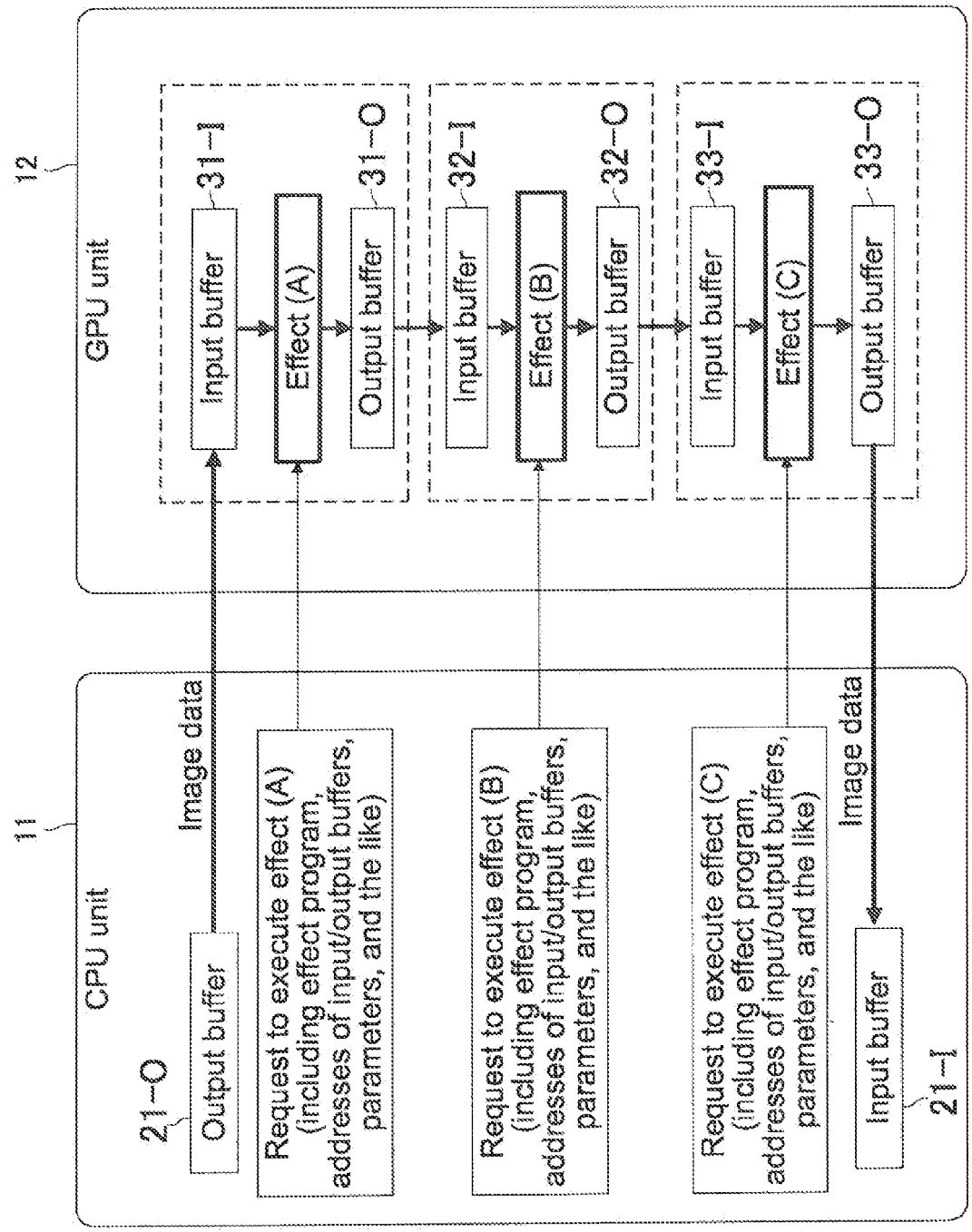
FIG. 8 is a diagram showing an example of connection relations of input/output buffers of respective effects.

FIG. 8 is a diagram showing an example of connection relations of input/output buffers of the respective effects in a case where the GPU 121 sets to execute three pieces of effect processing in succession.

Here, an effect (A), an effect (B), and an effect (C) are set to be executed in succession. Each of an output buffer 21-O and an input buffer 21-I for image data is allocated to the CPU memory 112 by the video editing program, and the output buffer 21-O stores image data of an effect target.

The connection relations of input/output buffers of the respective effect of FIG. 8 are as described below.

An input buffer 31-I and an output buffer 31-O are allocated to the effect (A). An input buffer 32-I and an output buffer 32-O are allocated to the effect (B). An input buffer 33-I and an output buffer 33-O are allocated to the effect (C). Image data held in the output buffer 21-O provided in the CPU memory 112 is transferred to the input buffer 31-I allocated to the effect (A). The GPU 121 executes processing of the effect (A) on image data held in the input buffer 31-I, and the result is written in the output buffer 31-O. The output buffer 31-O is used as an input buffer 32-I for the effect (B). The GPU 121 executes processing of the effect (B) on image data stored in the input buffer 32-I, and the result is written in an output buffer 32-O. Subsequently, the output buffer 32-O is used as an input buffer 33-I for the effect (C). The GPU 121 executes processing of the effect (C) on image data stored in the input buffer 33-I, and the result is written in an output buffer 33-O. Then, image data held in the output buffer 33-O is transferred to the input buffer 21-I allocated to the CPU memory 112.

The CPU 111 sets the above-mentioned connection relations of the input/output buffers of the respective effects based on effect setting information stored in the CPU memory 112. Note that the output buffer 21-O and the input buffer 21-I provided in the CPU memory 112 are set not based on effect setting information but based on the video editing program.

After that, the CPU 111 controls the GPU 121 to execute each processing of the effect (A), the effect (B), and the effect (C) on image data of an effect target as follows.

(3. Effect Execution)

After setting connection relations of the respective buffers, the CPU 111 receives an instruction to start to execute effects from the video editing program, and calls a subroutine for executing effects. FIG. 6 is a flowchart showing a subroutine for executing effects.

The CPU 111 obtains an address of the output buffer 21-O in the CPU memory 112 holding effect-target image data and an address of the input buffer 21-I in the CPU memory 112 which will hold return image data from the GPU unit 12 from the video editing program (FIG. 4: S405, FIG. 6: S601).

Next, the CPU 111 transfers the effect-target image data from the output buffer 21-O in the CPU memory 112 to the input buffer 31-I allocated to the effect (A) (FIG. 4: S406/S406R, FIG. 6: S602).

Next, the CPU 111 extracts address information on the input/output buffers 31-I, 31-O allocated to the effect (A) based on the connection relations of the respective effect input/output buffers stored in the CPU memory 112 (FIG. 6: S604). Subsequently, the CPU 111 extracts parameters of the effect (A) from the effect setting information stored in the CPU memory 112 (FIG. 6: S605). After that, the CPU 111 reads out an effect program for GPU of the effect (A) from the storage device 16, adds the address information on the input/output buffers 31-I, 31-O, the parameters of the effect (A), the number of threads, the number of grids, and the like as arguments to the effect program for GPU to obtain an effect execution request, and transfers the effect execution request to the GPU 121 (FIG. 4: S407, FIG. 6: S606).

As shown in FIG. 7, receiving the request to execute the effect (A) (FIG. 7: S701), the GPU 121 calculates access-target addresses for the respective threads based on the addresses of the input/output buffers 31-I, 31-O obtained as arguments (FIG. 7: S702). After that, the GPU 121 executes in parallel, for a unit of thread, effect processing on data located in the addresses in the input buffer 31-I calculated as the respective access targets based on the effect program for GPU with reference to the parameters given as arguments, and writes the results in the addresses in the output buffer 31-O calculated as the respective writing targets (FIG. 7: S703). After that, the GPU 121 notifies the CPU 111 that the processing of the effect (A) has been completed through the bus 17 (FIG. 4: S407R). As described above, the processing of the effect (A) is completed.

Receiving the notification that the processing of the effect (A) has been completed from the GPU 121, the CPU 111 causes the GPU 121 to execute processing of the subsequent effect (B). That is, the CPU 111 extracts address information on the input/output buffers 32-I, 32-O allocated to the effect (B) based on the connection relations of the respective effect input/output buffers stored in the CPU memory 112 (FIG. 6: S604). Subsequently, the CPU 111 extracts parameters of the effect (B) from the effect setting information stored in the CPU memory 112 (FIG. 6: S605). After that, the CPU 111 reads out an effect program for GPU of the effect (B) from the storage device 16, adds the address information on the input/output buffers 32-I, 32-O, the parameters of the effect (B), the number of threads, the number of grids, and the like as arguments to the effect program for GPU to obtain an effect execution request, and transfers the effect execution request to the GPU 121 (FIG. 4: S408, FIG. 6: S606).

Receiving the request to execute the effect (B) (FIG. 7: S701), the GPU 121 calculates access-target addresses for the respective threads based on the addresses of the input/output buffers 32-I, 32-O obtained as arguments (FIG. 7: S702). After that, the GPU 121 executes in parallel, for a unit of thread, effect processing on data located in the addresses in the input buffer 32-I calculated as the respective access targets based on the effect program for GPU with reference to the parameters given as arguments, and writes the results in the addresses in the output buffer 32-O calculated as the respective writing targets (FIG. 7: S703). After that, the GPU 121 notifies the CPU 111 that the processing of the effect (B) has been completed through the bus 17 (FIG. 4: S408R). As described above, the processing of the effect (B) is completed.

Receiving the notification that the processing of the effect (B) has been completed from the GPU 121, similar to the above, the CPU 111 transfers an effect execution request for causing the GPU 121 to execute processing of the effect (C) through the similar processing to the GPU 121 (FIG. 4: S409, FIG. 6: S606). That is, the CPU 111 extracts address information on the input/output buffers 33-I, 33-O allocated to the effect (C) based on the connection relations of the respective effect input/output buffers stored in the CPU memory 112 (FIG. 6: S604). Subsequently, the CPU 111 extracts parameters of the effect (C) from the effect setting information stored in the CPU memory 112 (FIG. 6: S605). After that, the CPU 111 reads out an effect program for GPU of the effect (C) from the storage device 16, adds the address information on the input/output buffers 33-I, 33-O, the parameters of the effect (C), the number of threads, the number of grids, and the like as arguments to the effect program for GPU to obtain an effect execution request, and transfers the effect execution request to the GPU 121 (FIG. 4: S409, FIG. 6: S606).

Receiving the request to execute the effect, the GPU 121 calculates access-target addresses for the respective threads based on the respective address information on the input/output buffers 33-I, 33-O obtained as arguments (FIG. 7: S702). After that, the GPU 121 executes in parallel, for a unit of thread, effect processing on data located in the addresses in the input buffer 33-I calculated as the respective access targets based on the effect program for GPU with reference to the parameters given as arguments, and writes the results in the addresses in the output buffer 33-O calculated as the respective writing targets (FIG. 7: S703). After that, the GPU 121 notifies the CPU 111 that the processing of the effect (C) has been completed through the bus 17 (FIG. 4: S409R). As described above, the processing of the effect (C) is completed.

Receiving the notification that the processing of the effect (C) has been completed (FIG. 6: S603, YES), the CPU 111 stores image data held in the output buffer 33-O in the input buffer 21-I in the CPU memory 112 set by the video editing program (FIG. 4: S410/S410R, FIG. 6: S607). The image data held in the input buffer 21-I in the CPU memory 112 is recorded in the storage device 16.

After that, the CPU 111 reads image data of the next frame from the storage device 16 in the output buffer 21-O in the CPU memory 112, and transfers the image data from the output buffer 21-O to the input buffer 31-I allocated to the effect (A) through the bus 17. After that, similarly, the GPU unit 12 applies the respective effect processing on the image data and returns the image data to the input buffer 21-I in the CPU memory 112.

(4. Change of the Number of Effects and Execution Sequence)

Next, a behavior in a case of changing the number of effects or the execution sequence of effects after connection relations of input/output buffers of the respective effects have been set will be described. The number of effects or the execution sequence of effects is changed, for example, for the following purpose. For example, when effect processing is executed in succession on a plurality of frame videos in one scene, the CPU 111 aborts the effect processing according to an instruction from a user, receives changes of the number of effects or the execution sequence of effects from a user, and reflects the changes in effect processing on image data of the subsequent frames.

Note that the number of effects or the execution sequence of effects may be changed through the display of the display device 19. For example, the CPU 111 displays a change operation screen for selecting an effect to be canceled by a user or inputting an instruction to change the execution sequence of effects by a user. According to a change instruction input through the change operation screen by using the operation input device 18 by a user, the CPU 111 changes the effect setting information stored in the CPU memory 112.

Figure 9:
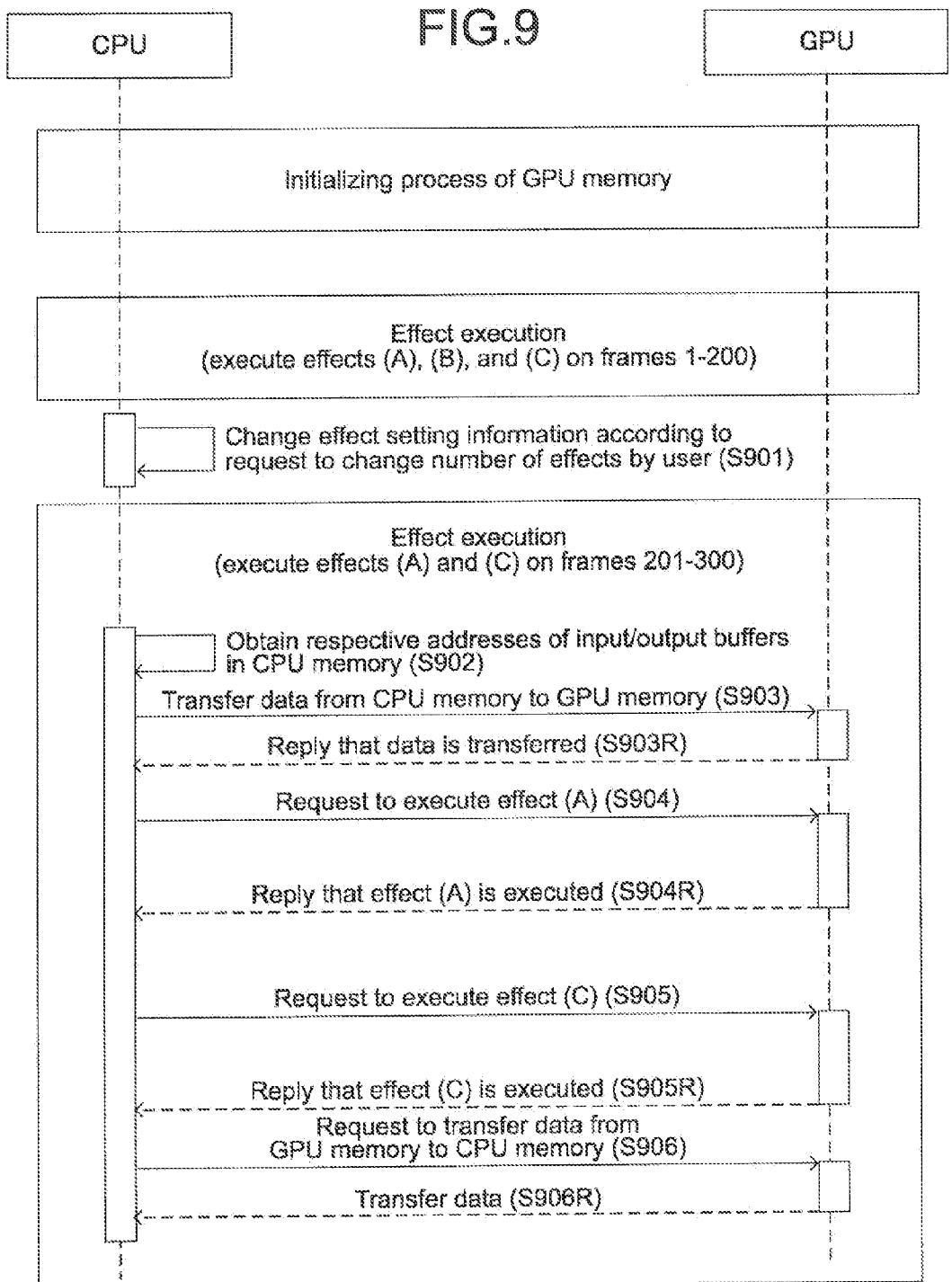
FIG. 9 is a sequence diagram relating to effect execution controls between the CPU unit and the GPU Unit in a case where an effect (B) of three effect (A), effect (B), and effect (C) is canceled based on an instruction by a user, whereby effect setting information is changed.

FIG. 9 is a sequence diagram relating to effect execution controls between the CPU unit 11 and the GPU unit 12 in a case where the effect (B) of the three effect (A), effect (B), and effect (C) is canceled based on an instruction by a user, whereby the effect setting information is changed.

Figure 10:
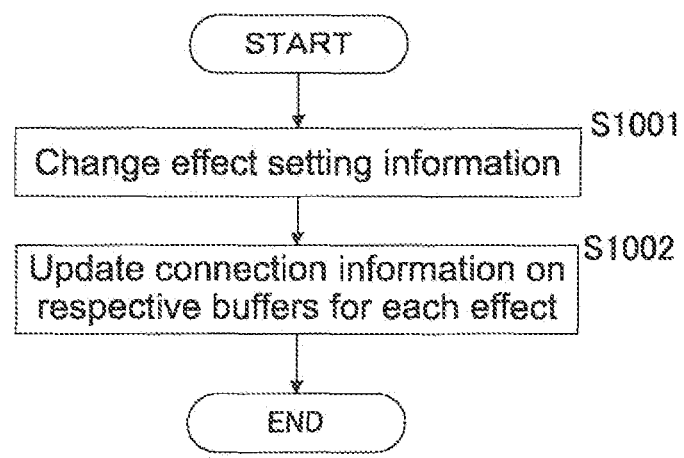
FIG. 10 is a flowchart showing a flow of execution controls of GPU effects by the CPU in a case where effect setting information is changed.

FIG. 10 is a flowchart showing a flow of execution controls of GPU effects by the CPU 111 in a case where effect setting information is changed.

It is assumed that image data of a frame 1 to a frame 300 be effect-target image data. It is now assumed that, during executing effect processing on image data of a frame 200, an instruction to abort the effect processing be input by a user. Receiving the instruction, the CPU 111 aborts the effect processing when the effect processing on the frame 200 is completed.

After that, it is assumed that a request to change the number of effects such that the effect (B) of the three effect (A), effect (B), and effect (C) is canceled be input by a user. According to the change request, the CPU 111 changes effect setting information stored in the CPU memory 112 (FIG. 9: S901, FIG. 10: S1001). After the effect setting information is changed, based on the changed effect setting information, the CPU 111 updates, while using the input/output buffers reserved in the GPU memory 122 in the initializing process as they are, only connection information on the input/output buffers (FIG. 10: S1002). After that, a subroutine to execute an effect (FIG. 6) is executed.

Figure 11:
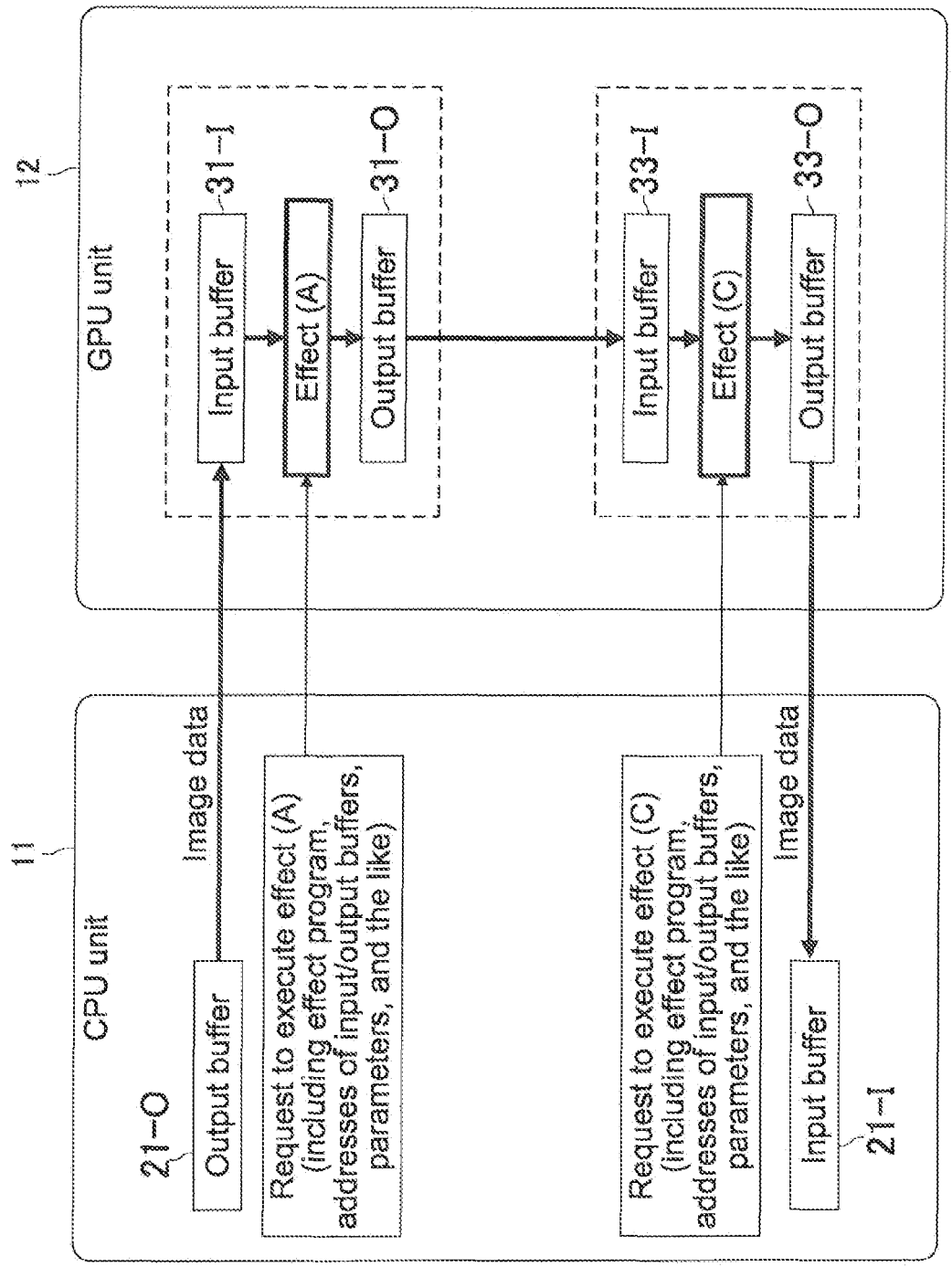
FIG. 11 is a diagram showing updated connection relations of the input/output buffers of the respective effects.

FIG. 11 is a diagram showing updated connection relations of the input/output buffers of the respective effects. As shown in FIG. 11, after the update, the connection relation of the output buffer 31-O and the input buffer 33-I is set such that image data in the output buffer 31-O allocated to the effect (A) is transferred to the input buffer 33-I allocated to the effect (C).

In the effect execution controls to image data of a frame 201 and subsequent frames, the CPU 111 generates requests to execute the respective effects based on the updated connection relations of input/output buffers of the respective effects. Therefore, when the effect execution of the effect (C) is requested, the GPU 121 is notified of address information on the output buffer 31-O being a source of image data input into the input buffer 33-I together with address information on the input/output buffers 33-I, 33-O allocated to the effect (C). As a result, the GPU 121 may control to store image data in the output buffer 31-O in the input buffer 33-I, to execute effect processing on the image data, and to write the result in the output buffer 33-O.

Note that effects to be canceled may be freely selected from a plurality of effects.

Figure 12:
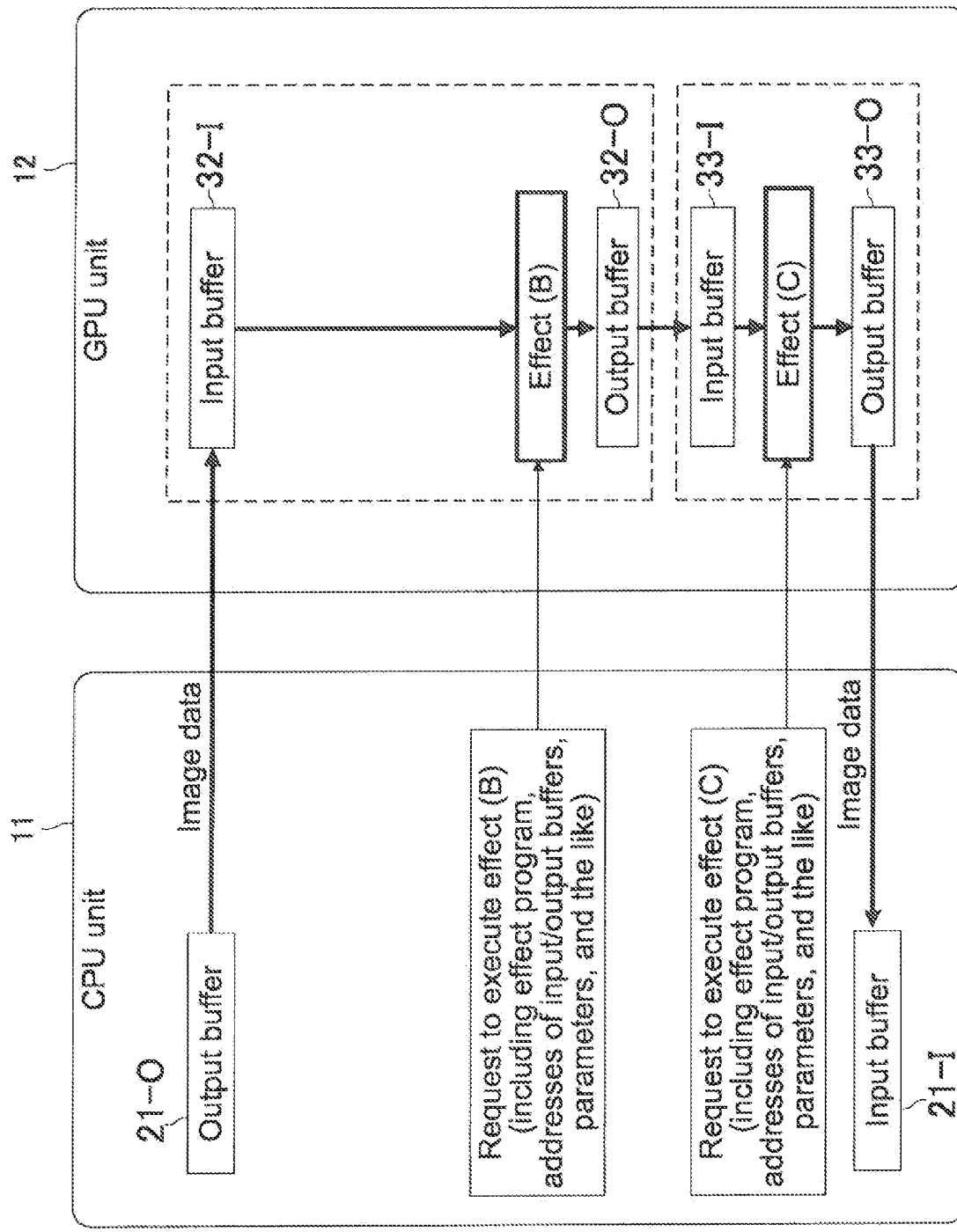
FIG. 12 is a diagram showing connection relations of the input/output buffers of the respective effects in a case where the number of effects is changed such that the effect (A) of the three effect (A), effect (B), and effect (C) is canceled.

FIG. 12 is a diagram showing connection relations of the input/output buffers of the respective effects in a case where the number of effects is changed such that the effect (A) of the three effect (A), effect (B), and effect (C) is canceled. In this case, the output buffer 21-O in the CPU memory 112 is connected to the input buffer 32-I such that image data held in the output buffer 21-O in the CPU memory 112 is transferred to the input buffer 32-I allocated to the effect (B) through the bus.

Figure 13:
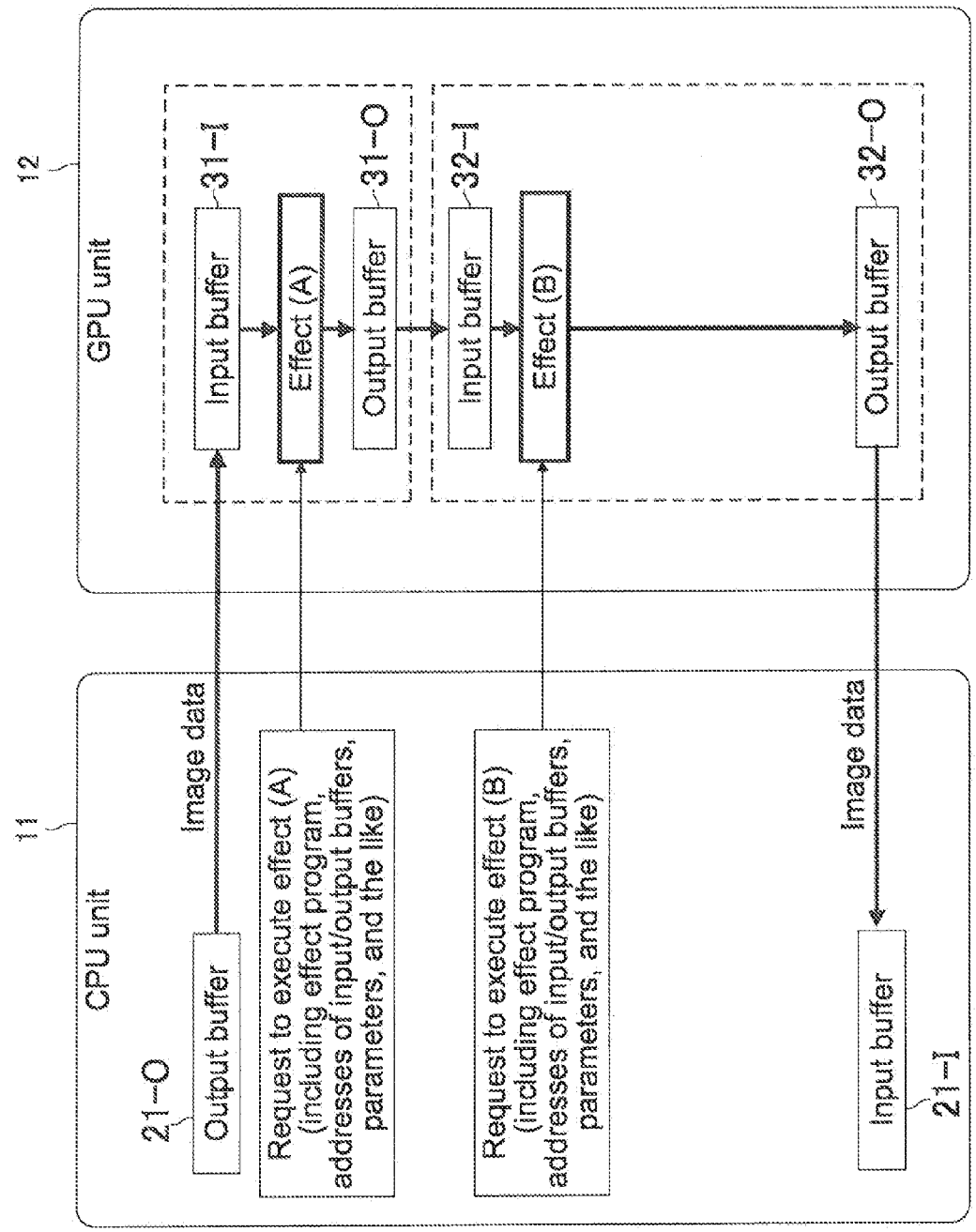
FIG. 13 is a diagram showing connection relations of the input/output buffers of the respective effects in a case where the number of effects is changed such that the effect (C) of the three effect (A), effect (B), and effect (C) is canceled.

FIG. 13 is a diagram showing connection relations of the input/output buffers of the respective effects in a case where the number of effects is changed such that the effect (C) of the three effect (A), effect (B), and effect (C) is canceled. In this case, the output buffer 32-O is connected to the input buffer 21-I in the CPU memory 112 such that image data held in the output buffer 32-O allocated to the effect (B) is transferred to the input buffer 21-I in the CPU memory 112.

Figure 14:
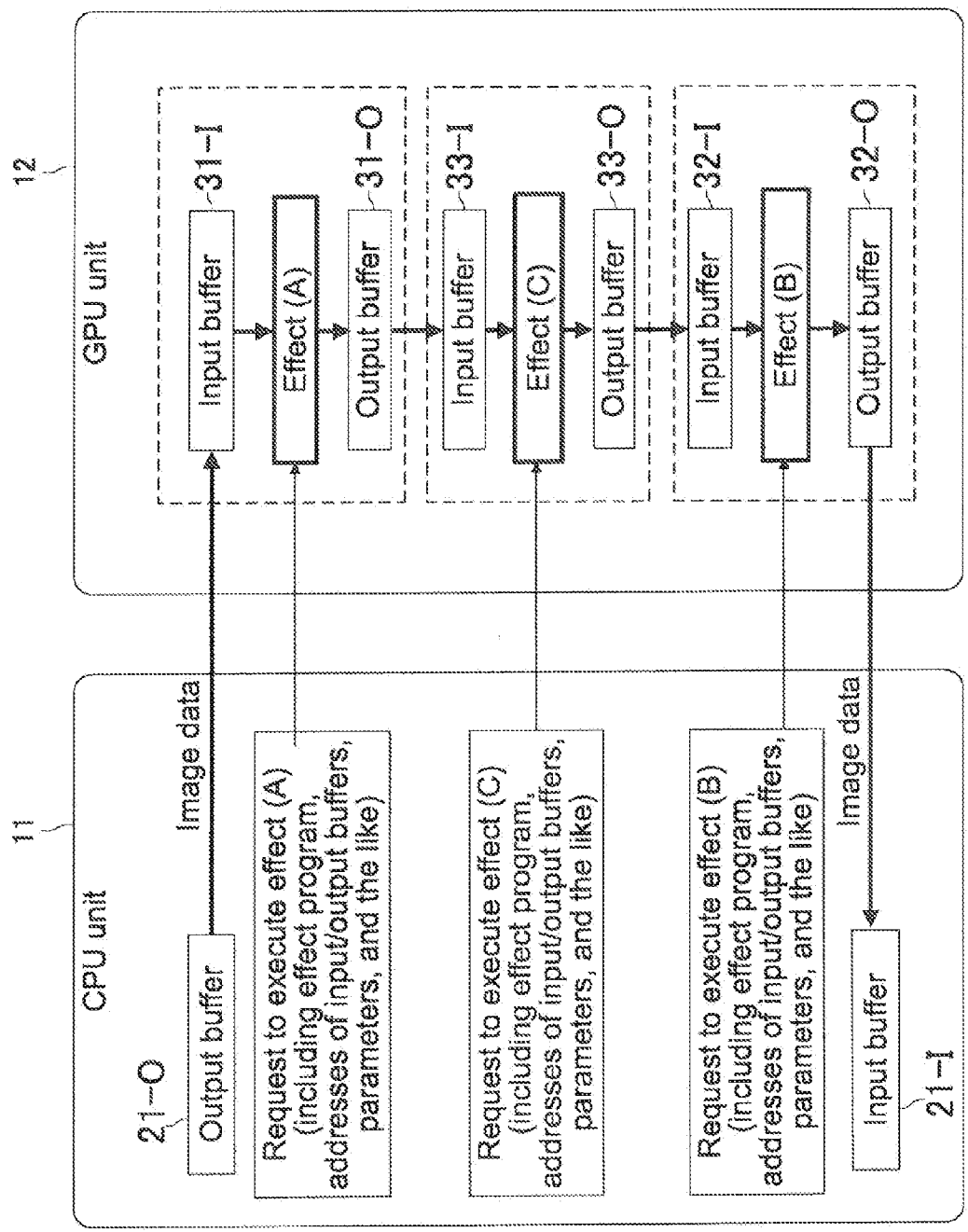
FIG. 14 is a diagram showing connection relations of the input/output buffers of the respective effects in a case where the execution sequence of the effect (B) and the effect (C) of the three effect (A), effect (B), and effect (C) is changed.

Further, FIG. 14 is a diagram showing connection relations of the input/output buffers of the respective effects in a case where the execution sequence of the effect (B) and the effect (C) of the three effect. (A), effect (B), and effect (C) is changed. Also in a case of changing an execution sequence of a plurality of effects as described above, similarly, based on the changed effect setting information, while using the input/output buffers reserved in the GPU memory 122 in the initializing process as they are, only connection information on the input/output buffers may be changed. That is, the CPU 111 connects the output buffer 31-O to the input buffer 33-I such that image data held in the output buffer 31-O allocated to the effect (A) is transferred to the input buffer 33-I allocated to the effect (C). Further, the CPU 111 connects the output buffer 33-O to the input buffer 32-I such that image data held in the output buffer 33-O allocated to the effect (C) is transferred to the input buffer 32-I allocated to the effect (B). Further, the CPU 111 connects the output buffer 32-O to the input buffer 21-I in the CPU memory 112 such that image data held in the output buffer 32-O allocated to the effect (B) is transferred to the input buffer 21-I in the CPU memory 112. The same is applied to other execution sequence changes.

As described above, according to this embodiment, in a case where the GPU 121 applies a plurality of pieces of effect processing in succession on image data, image data is input/output into/from the input/output buffers in the GPU memory 122 allocated to the respective effects to thereby execute a plurality of effects in succession, whereby the number of exchange of image data between the CPU memory 112 and the GPU memory 122 may be minimized (two). As a result, the speed of effect processing may be higher.

Further, according to this embodiment, after input/output buffers for the respective effects are reserved in the GPU memory 122, the number of effects that the GPU 121 executes may be decreased, or an execution sequence of effects may be changed as needed. Further, in reducing the number of effects or in changing an execution sequence of effects, it is not necessary to re-reserve necessary input/output buffers by executing initializing process by the GPU memory 122 again. So reduction of the number of effects or change of an execution sequence of effects may be immediately reflected in the actual effect processing, and the whole editing process may be made efficiently.

Modified Example 1

In the above-mentioned embodiment, every time the GPU 121 executes one piece of effect processing, address information on input/output buffers allocated to the effect is transferred to the GPU 121. Not limited to this, for example, address information on the respective input/output buffers allocated to all the effects to be executed by the GPU 121 may be collectively notified the GPU 121 of before executing the first effect processing or before effect-target image data is transferred from the CPU memory 112 to the GPU memory 122.

Note that the present disclosure is not limited to the embodiment as described above, but may be variously modified within the scope of technological thought of the present disclosure.

The present disclosure contains subject matter related to that disclosed in Japanese Priority Patent Application JP 20.10-148192 filed in the Japan. Patent Office on Jun. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    an image processing unit capable of executing, in parallel, processing on an image for each unit of the image by dividing the image into units;
    a memory section capable of providing an input buffer capable of holding image data being a processing target of each processing by the image processing unit, and an output buffer capable of holding image data being a processing result;
    an input section through which a user selects (a) a plurality of kinds of processing to be queued and executed by the image processing unit, and (b) an execution sequence of the plurality of kinds of processing queued by the image processing unit; and
    a controller section configured
        to reserve, for each of the plurality of kinds of processing selected by the user through the input section, an input buffer and an output buffer for each processing in the memory section,
        to set an input-output connection relation between the buffers for each of the plurality of kinds of processing in the selected execution sequence, and
        to sequentially notify, based on the set connection relation, the image processing unit of address information of the input buffer in the memory section and the output buffer for each of the plurality of kinds of processing sequentially executed by the image processing unit in the selected execution sequence.

2. The information processing apparatus according to claim 1, wherein
    the input section is capable of receiving from the user an instruction to cancel part of the plurality of kinds of processing to be executed by the image processing unit, and
    the controller section is configured
        to update, based on the input instruction content, an input-output connection relation between the buffers, and
        to notify, based on the updated connection relation, the image processing unit of address information of the input buffer in the memory section and the output buffer for each processing sequentially executed by the image processing unit.

3. The information processing apparatus according to claim 1, wherein
    the input section is capable of receiving from the user an instruction to change the execution sequence of the plurality of kinds of processing to be executed by the image processing unit, and
    the controller section is configured
        to update, based on the input instruction content, an input-output connection relation between the buffers, and
        to notify, based on the updated connection relation, the image processing unit of address information of the input buffer in the memory section and the output buffer for each processing sequentially executed by the image processing unit.

4. An information processing method, comprising:
    selecting by a user, through an input section, (a) a plurality of kinds of processing to be queued and executed by an image processing unit capable of executing, in parallel, processing on an image for each unit of the image by dividing the image into units, and (b) an execution sequence of the plurality of kinds of processing queued by the image processing unit;
    reserving, by a controller section, for each of the plurality of kinds of processing selected by the user through the input section, an input buffer and an output buffer for each processing in a memory section capable of providing an input buffer capable of holding image data being a processing target of each processing by the image processing unit and an output buffer capable of holding image data being a processing result;
    setting, by the controller section, an input-output connection relation between the buffers for each of the plurality of kinds of processing in the selected execution sequence; and
    sequentially notifying, by the controller section, based on the set connection relation, the image processing unit of address information of the input buffer in the memory section and the output buffer for each of the plurality of kinds of processing sequentially executed by the image processing unit in the selected execution sequence.

* * * * *